United States Patent
Jaradi et al.

(10) Patent No.: US 9,573,497 B2
(45) Date of Patent: Feb. 21, 2017

(54) ARMREST RETRACTABLE UPON AN ADVERSE EVENT AND SEAT ASSEMBLY EMPLOYING THE SAME

(71) Applicant: Ford Global Technologies, LLC, Dearborn, MI (US)

(72) Inventors: Dean M. Jaradi, Macomb, MI (US); Mohammed Omar Faruque, Ann Arbor, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 194 days.

(21) Appl. No.: 14/135,857

(22) Filed: Dec. 20, 2013

(65) Prior Publication Data
US 2015/0175039 A1 Jun. 25, 2015

(51) Int. Cl.
*B60N 2/427* (2006.01)
*B60N 2/42* (2006.01)
*B60N 2/46* (2006.01)

(52) U.S. Cl.
CPC ....... *B60N 2/42727* (2013.01); *B60N 2/4207* (2013.01); *B60N 2/4235* (2013.01); *B60N 2/462* (2013.01); *B60N 2/4606* (2013.01); *B60N 2/4613* (2013.01); *B60N 2/4626* (2013.01)

(58) Field of Classification Search
None
See application file for complete search history.

(56) References Cited

U.S. PATENT DOCUMENTS

| | | | | |
|---|---|---|---|---|
| 4,881,754 A | * | 11/1989 | Lutze et al. | 280/728.1 |
| 5,076,645 A | * | 12/1991 | Yokota | 297/411.32 |
| 5,538,283 A | | 7/1996 | Townsend | |
| 9,162,598 B2 | * | 10/2015 | Faruque et al. | |
| 2004/0140697 A1 | * | 7/2004 | Yuhki et al. | 297/113 |
| 2005/0200186 A1 | * | 9/2005 | Schumacher | B60N 2/3047 |
| | | | | 297/411.38 |
| 2010/0045067 A1 | * | 2/2010 | Schulz | 296/153 |
| 2012/0139222 A1 | | 6/2012 | Lee et al. | |

FOREIGN PATENT DOCUMENTS

| | | |
|---|---|---|
| CN | 104723918 A * | 6/2015 |
| DE | 4418589 A1 | 11/1995 |
| DE | 10316731 A1 | 11/2004 |
| DE | 102005061982 A1 | 6/2007 |
| EP | 0733518 A1 | 9/1996 |
| WO | 9209451 A1 | 6/1992 |

\* cited by examiner

Primary Examiner — David E Allred
(74) Attorney, Agent, or Firm — LeClairRyan

(57) ABSTRACT

The present invention in one or more embodiments provides a seat assembly of a vehicle, including a seat base, a seat back communicating with the seat base, an armrest communicating with at least one of the seat back and the seat base, and a pretension unit connected to the armrest such that the armrest is retractable upon activation of the pretension unit. The pretension unit may include a pretensioner, a pulley, and a cable.

7 Claims, 9 Drawing Sheets

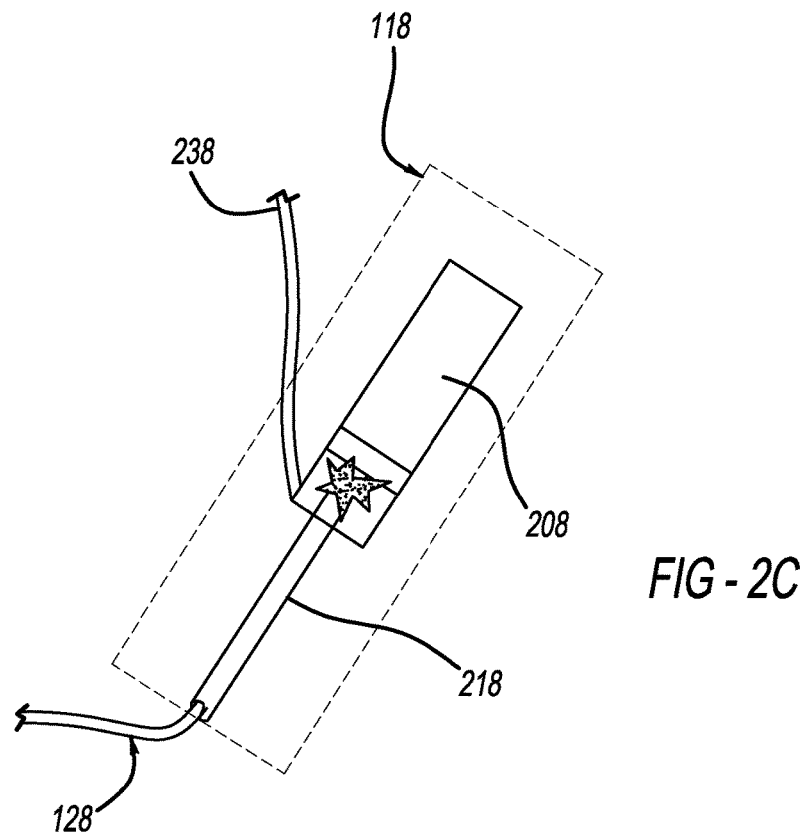
FIG - 2C
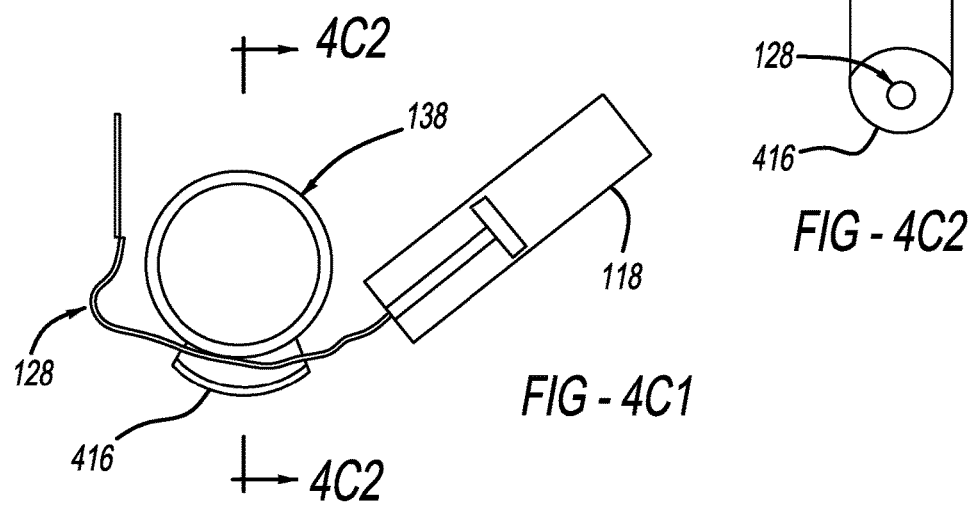
FIG - 4C1
FIG - 4C2

ARMREST RETRACTABLE UPON AN ADVERSE EVENT AND SEAT ASSEMBLY EMPLOYING THE SAME

TECHNICAL FIELD

The disclosed inventive concept relates generally to an armrest retractable upon an adverse event, such as upon the occurrence of a crash and in particular a side impact crash.

BACKGROUND

Certain existing vehicle interiors are designed with armrests integrated with the door trim. Since they are permanently mounted on the door trim they affect, often negatively, the overall interior roominess. Therefore, these existing armrests may limit the potential in door trim design such that interior styling and volume may thus be unnecessarily compromised.

The existence of these armrests may also reduce the gap between the occupant and the door trim, and thereby affect proper side airbag deployment and airbag volume. Moreover, relatively stiff armrests may engage the occupant during side crashes and result in relatively greater rib deflections.

It would thus be advantageous if an armrest is provided to solve one or more of these identified problems.

SUMMARY

The disclosed inventive concept is believed to have overcome one or more of the problems associated with vehicular armrests.

The present invention in one or more embodiments provides a seat assembly of a vehicle, including a seat base, a seat back communicating with the seat base, an armrest communicating with at least one of the seat back and the seat base, and a pretension unit connected to the armrest such that the armrest is retractable upon an activation of the pretension unit. In certain instances, the pretension unit may be an anchor pretension unit, and in particular an anchor pretension unit that may be pyro-activated and cable mounted, in which a pyrotechnical pretensioner may be used.

The pretension unit may include a pretensioner and a cable wherein the cable connects the pretensioner and the armrest to effect a retraction of the armrest upon an activation of the pretensioner. The pretension unit may further include a pulley such that a movement direction of the cable may be varied.

The armrest may be positioned on the seat back. In this configuration, the armrest may include a first part, a second part, and a lockable hinge connecting the first and second parts, the second part extends away from the seat back in an open position and retracts towards the seat back in a closed position. The second part may be received within a cavity of the seat back when fully retracted.

The armrest may be positioned on the seat base. In this configuration, the armrest may be connected to the seat base via a rail, such that the armrest extends away from the seat base via the rail in an open position and retracts towards the seat base via the rail in a closed position. The armrest may be positioned no higher than a seat surface of the seat back when fully retracted. The armrest may be received within a cavity of the seat base when fully retracted. The armrest may be positioned alongside the seat base.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein:

FIG. 2A through FIG. 2C illustratively and collectively depict a mechanism of operating the armrest referenced in FIG. 1A;

FIG. 4C1 illustratively depicts a perspective view of a pretension unit for use with the armrest referenced in FIG. 4A or FIG. 4B;

FIG. 4C2 illustratively depicts a cross-sectional view of the pretension unit referenced in FIG. 4C1.

DETAILED DESCRIPTION OF ONE OR MORE EMBODIMENTS

Figure 1A:
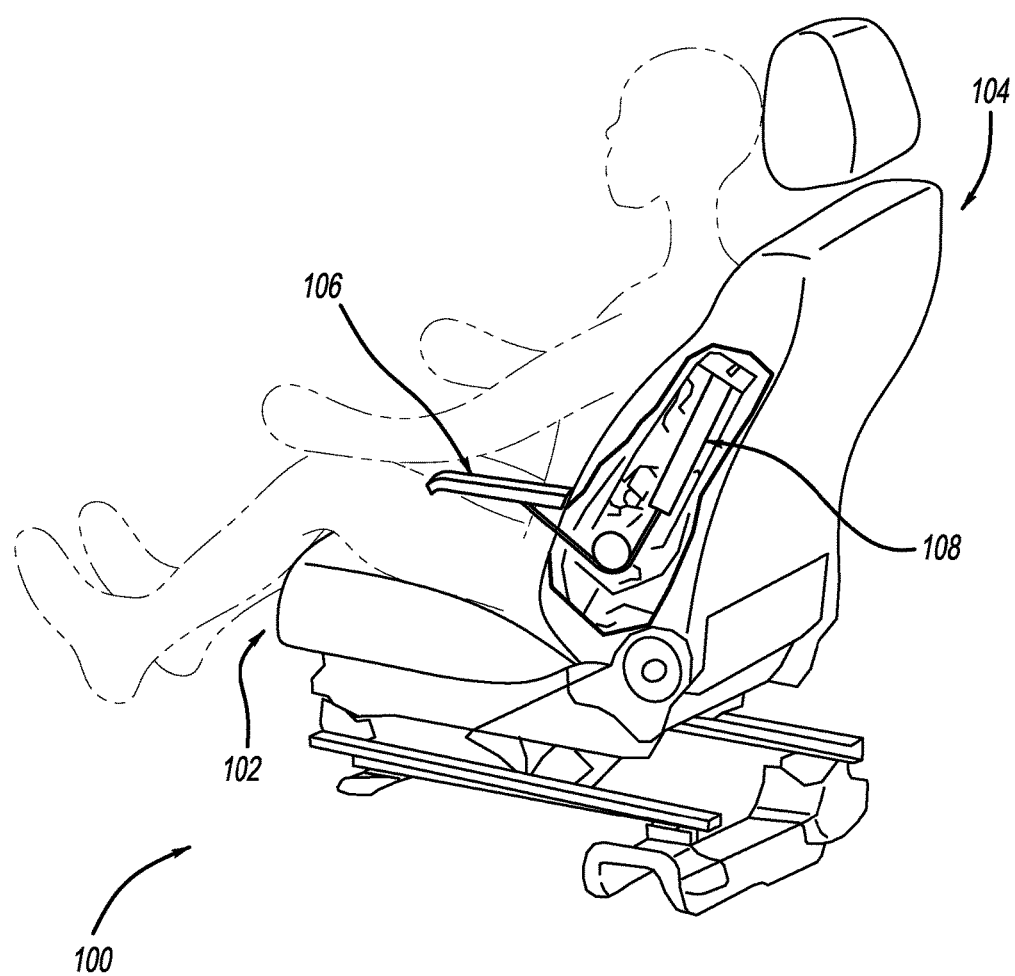
FIG. 1A illustratively depicts a perspective view of an armrest according to at least one embodiment.

As referenced in the figures, the same reference numerals are used to refer to the same components. In the following description, various operating parameters and components are described for different constructed embodiments. These specific parameters and components are included as examples and are not meant to be limiting.

The present invention in one or more embodiments is advantageous at least in that an armrest may be provided as retractable in response to an adverse event, such as a crash and in particular a side impact crash. Upon the occurrence of or during such adverse event, the armrest may be quickly retracted to increase the gap between the occupant and the door trim for proper side airbag deployment and improved safety. This design also helps re-position the armrest away from the vulnerable zones of the occupant such as ribs and thereby improve occupant performance and safety.

Another advantage of the armrest according to the present invention in one or more embodiments is the capability of the armrest to enhance an interior smooth feel and flowing appearance. This contributes to improved interior styling and roominess. The armrest may be retracted when the vehicle is not moving and the engine is off. Accordingly, the vehicle interior may appear relatively roomier with improved egress and ingress.

In at least one embodiment, and as illustratively depicted in FIG. 1A, a seat assembly generally shown at 100 includes a seat base 102, a seat back 104 connected to the seat base 102, an armrest 106 connected to at least one of the seat base 102 and the seat back 104, and a pretension unit 108 connected to the armrest 106 such that the armrest 106 is retractable upon an activation of the pretension unit 108.

Figure 1B:
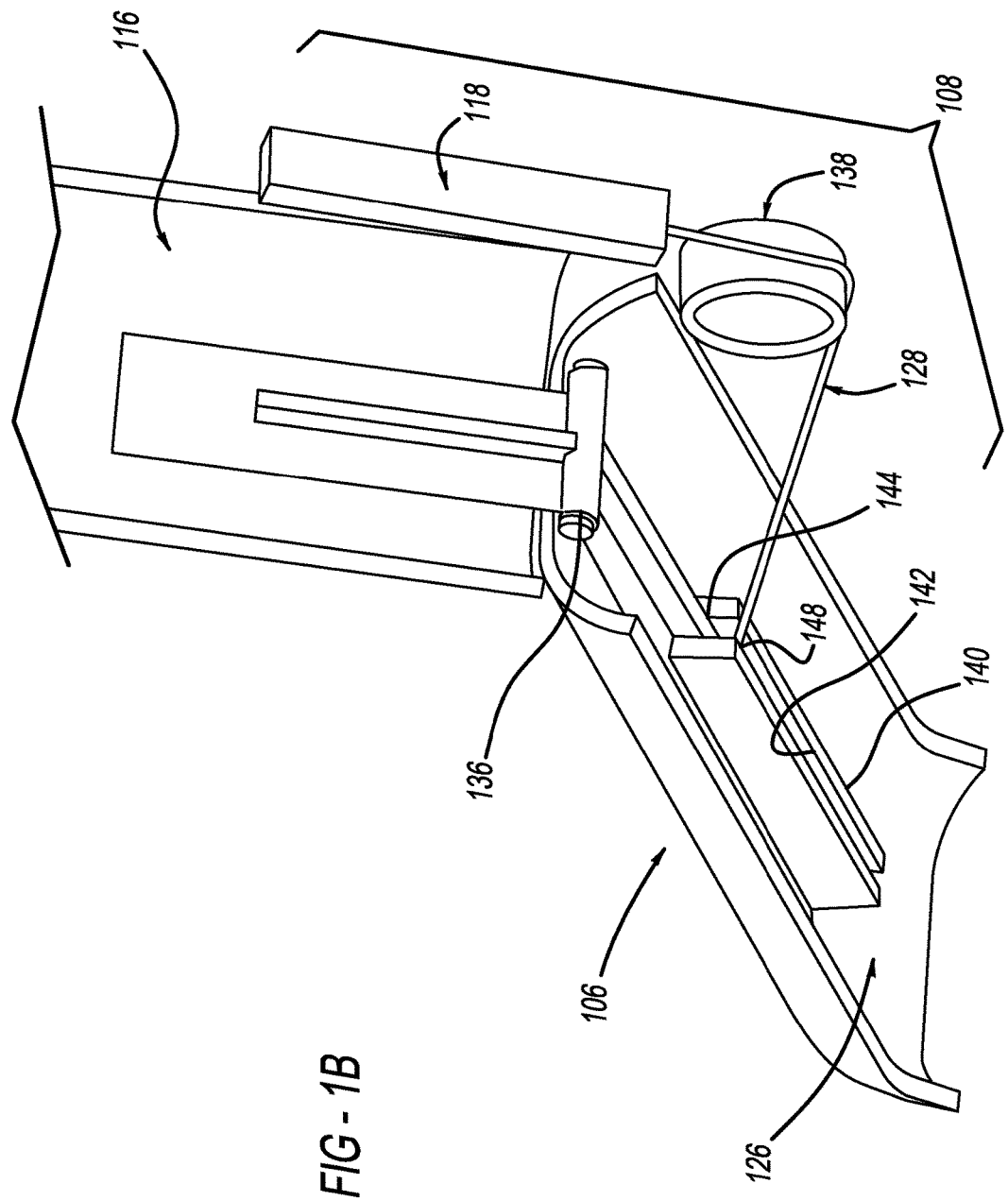
FIG. 1B illustratively depicts a partial enlarged view of the armrest referenced in FIG. 1A.

In certain instances, and as illustratively depicted in FIG. 1A in view of FIG. 1B, the armrest 106 may be positioned on the seat back 104. In this configuration, the armrest 106 may include a first part 116, a second part 126, and a lockable hinge 136 connecting the first and second parts 116, 126, wherein the second part 126 extends away from the seat back 104 in an open position and retracts towards the seat back 104 in a closed position.

Figure 2A:
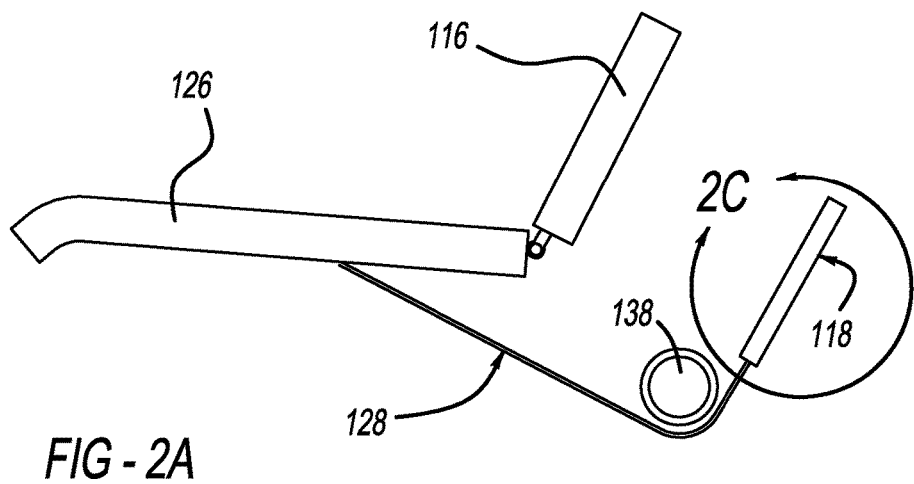
Figure 2B:
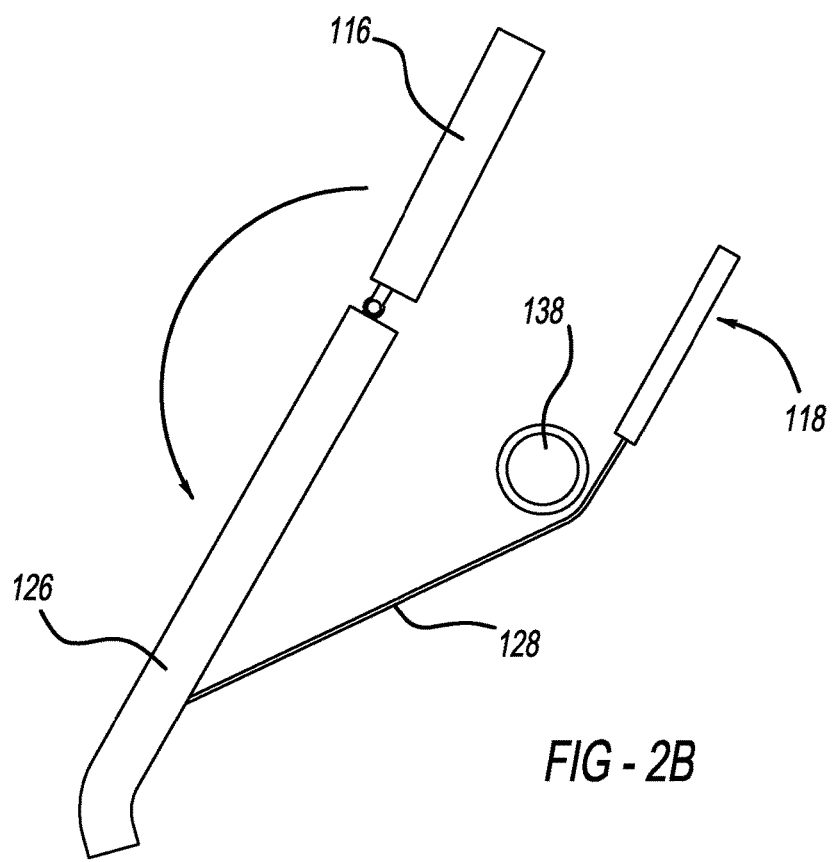

Referring back to FIG. 1B, and in view of FIGS. 2A to 2C, the pretension unit 108 may include a pretensioner 118, a cable 128 and a pulley 138. The pretensioner 118 may in turn include a tubular chamber 208, a piston 218 receivable within the tubular chamber 208, and a wiring 238 for connecting to a power source (not shown).

The tubular chamber 208 includes therein combustible gas and explosive igniter material separately positioned from the combustible gas. The explosive igniter material may be contained within a smaller chamber outfitted with two electrodes, which are wired to a vehicle RCM (Restraints Control Module). When the RCM detects a collision, it immediately applies an electrical signal or current across the electrodes. The spark from the electrodes ignites the igniter material, which combusts to ignite the combustible gas in the tubular chamber 208. The gas generates a great high output pressure. The pressure pushes against the piston and pulls the cable 128, and stows the armrest 106 as shown in FIGS. 2A to 2C.

Referring back to FIG. 1B, the cable 128 may be attached to a glider 140 underneath the second part 126 of the armrest 106. In normal operation of the armrest 106, an end 148 of the cable 128 glides through a groove 142 of the glider 140 and thereby does not affect its motion. At a deployed state the end 148 of the cable 128 is at a locking end 144 of the groove 142. In the event of a crash, the pretension unit 108 activates and pulls the armrest 106 down by overcoming the moment capacity of the lockable hinge 136.

Any suitable pretensioner such as pretensioners used in connection with safety belt buckle, safety belt retractor or safety belt anchor may be used to effect the retraction of the armrest 106 described herein. As mentioned herein elsewhere, the pretensioner is used to retract the armrest 106 during certain adverse events, and may deploy with or without airbag deployment. Depending upon the vehicle, the pretensioner may activate in certain frontal, side, rear and/or rollover crashes.

In certain instances, the pretensioner may be a pyro-activated or pyrotechnic pretensioner, which uses a pyrotechnic gas generator to propel a piston that is attached to the armrest with a cable. When vehicle sensors trigger the armrest retraction, the pyrotechnical gas generator is ignited, releasing a gas that expands and builds up pressure in a guiding tube. This pressure acts on the piston which may be forcefully propelled on to a pinion. The pinion transmits significant torque to the cable to pre-tension the armrest. Upon activation, the cable pulls and causes the armrest to retract. The whole activation process may take a number of milliseconds.

Activation of the pretension unit 108 and hence the retraction of the armrest 106 may be achieved via an algorithm that depends on ignition on/off states, via seatbelt latching and vehicle speed, and/or manually using an on/off switch.

In certain instances, the pretension unit 108 may be an anchor pretension unit, and in particular an anchor pretension unit that may be pyro-activated and cable mounted, in which a pyrotechnical pretensioner may be used.

Figure 3:
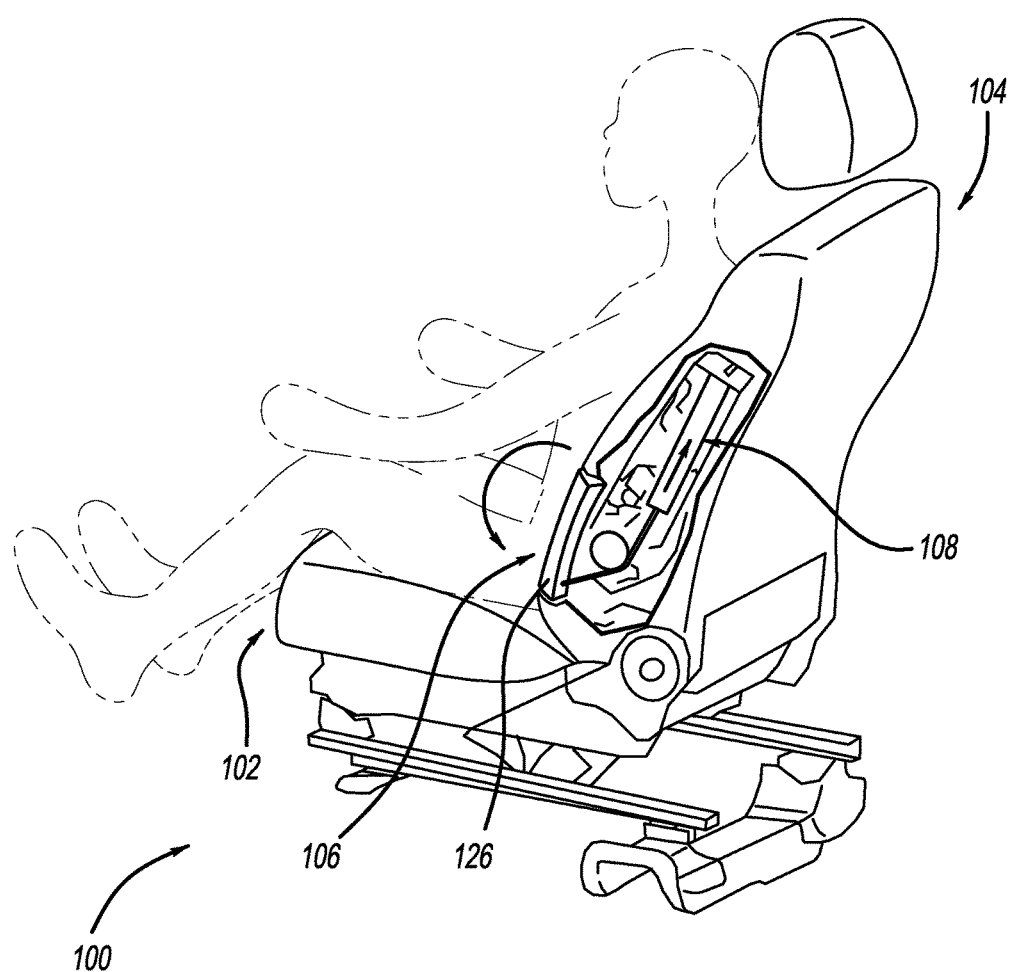
FIG. 3 illustratively depicts a perspective view of an armrest according to at least another embodiment.

In at least another embodiment, and as illustratively depicted in FIG. 3, the armrest 106 is configured such that the second part 126 may be received within a cavity of the seat back 104 when fully retracted. In this configuration, the first part 116 may be eliminated or designed as a built-in component of or as integral to the seat back 104. When fully retracted, the second part 126 of the armrest 106 may be flush with a surface of the seat back 104.

The armrest 106 described herein may be positioned to hug the seat edges tightly or aligned and flush with the seat surface so that the armrest 106 does not affect occupant egress/ingress and lap seatbelt interference. When activated, the armrest 106 may move into a locked position. This can be more desirable from interior styling point of view.

Figure 4A:
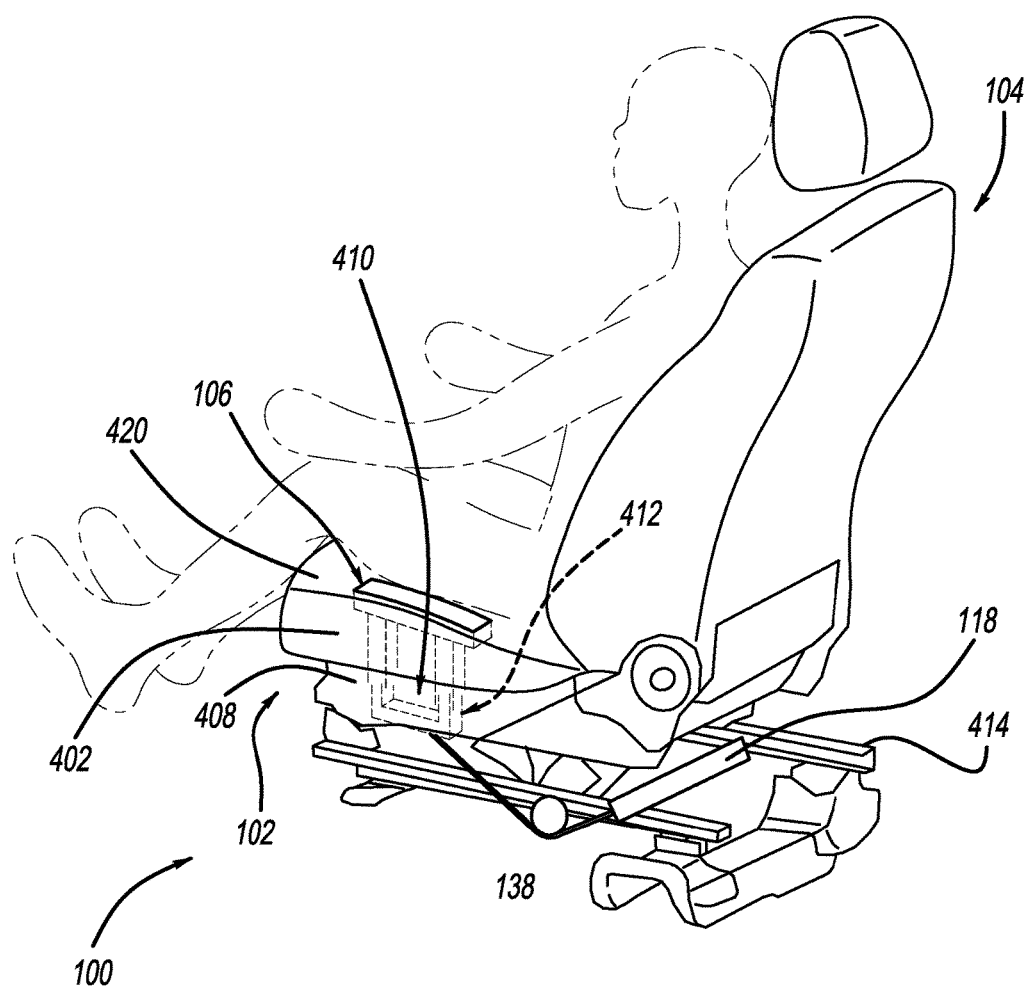
FIG. 4A and FIG. 4B each illustratively depicts a perspective view of an armrest according to at least yet another embodiment.
Figure 4B:
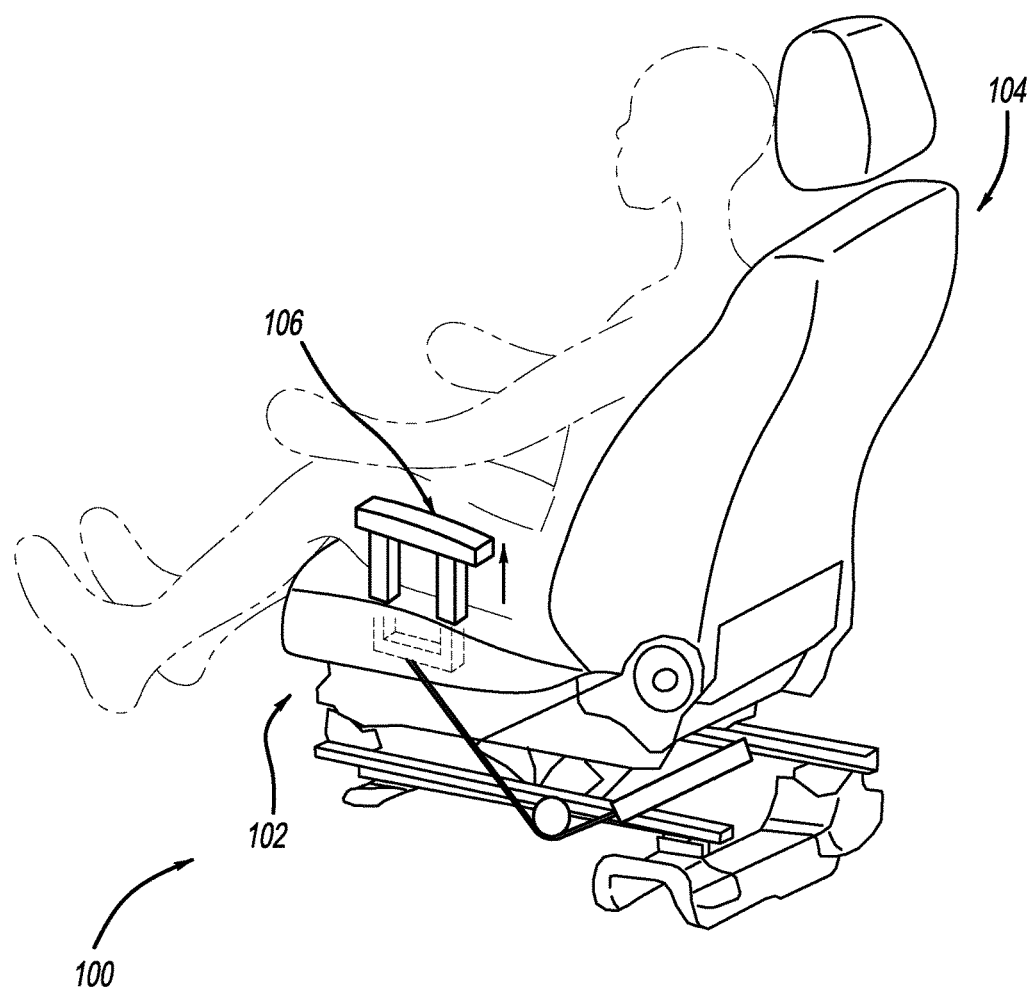

In yet another embodiment, and as illustratively depicted in FIG. 4A and FIG. 4B, the armrest 106 may be positioned on the seat base 102. In this configuration, the armrest 106 may be connected to the seat base 102 via a pair of legs 402, such that the armrest 106 extends away from the seat base 102 via the pair of legs 402 in an open position as shown in FIG. 4B and retracts towards the seat base 102 via the pair of legs 402 in a closed position as shown in FIG. 4A. Although two legs 402 are depicted in FIG. 4A, the number of legs 402 may vary which, in certain instances, may be one, two, three or more.

Referring back to FIG. 4A, the armrest 106 may be positioned no higher than a seat surface 420 of the seat base 102 when fully retracted. This configuration and/or functionality helps provide enhanced safety to the occupant upon the occurrence of an adverse event such as a side-impact collision. The armrest 106 may be received within a cavity of the seat base 102 when fully retracted.

The pretension unit 108 may work in this design in a fashion and manner similar to that referenced in FIG. 1A and FIG. 1B as described herein elsewhere. For instance, and as illustratively depicted in FIG. 4A, the cable 128 of the pretension unit 108 may be connected to an adapter 408. The adapter 408 includes a bar 410 supporting two leg receivers 412 each of which to receive each of the legs 402. The adapter 408 may be made of metal and be rendered relatively rigid.

Referring back to FIG. 4A, the pretensioner 118 may be mounted near and/or under a seat pan 414. The pulley 138 may be mounted under the seat pan 414 to guide the cable 128 as included in the pretension unit 108. The cable 128 may be provided with sufficient slack to deploy the armrest 106 without generating any unnecessary tension in the cable 128.

FIG. 4C1 illustratively depicts the cable 128 of the pretension unit 108 at a slack state. In this state, the pretension unit 108 may further include a cover 416 to partially restrain the cable 128 so as to prevent disengagement of the cable 128 away from the pulley 138. This state is relevant when the armrest is in its stowed position.

FIG. 4C2 illustratively depicts a cross-sectional view of the pretension unit 108 referenced in FIG. 4C1, taken along a line 4C2'-4C2'. This view demonstrates the cable 128 being restrained by the cover 416.

Figure 5A:
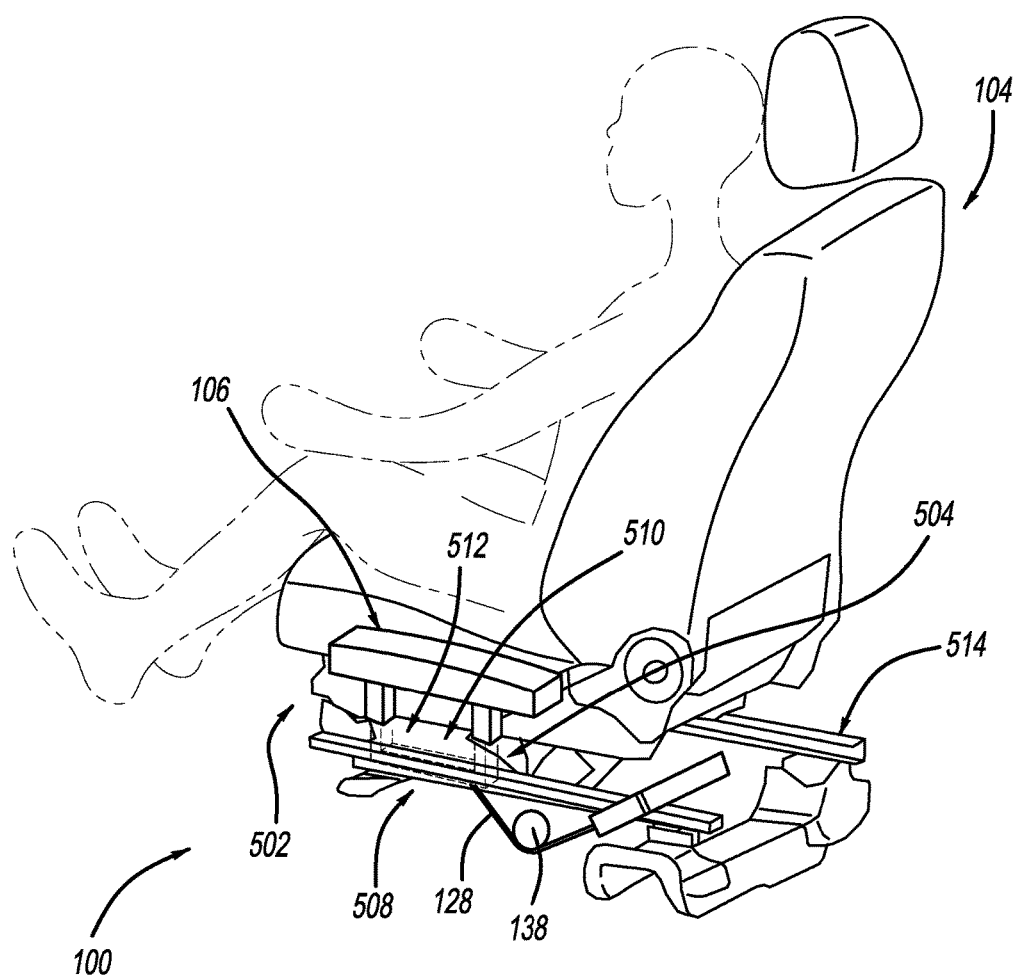
FIG. 5A and FIG. 5B each illustratively depict a perspective view of an armrest according to at least yet another embodiment.
Figure 5B:
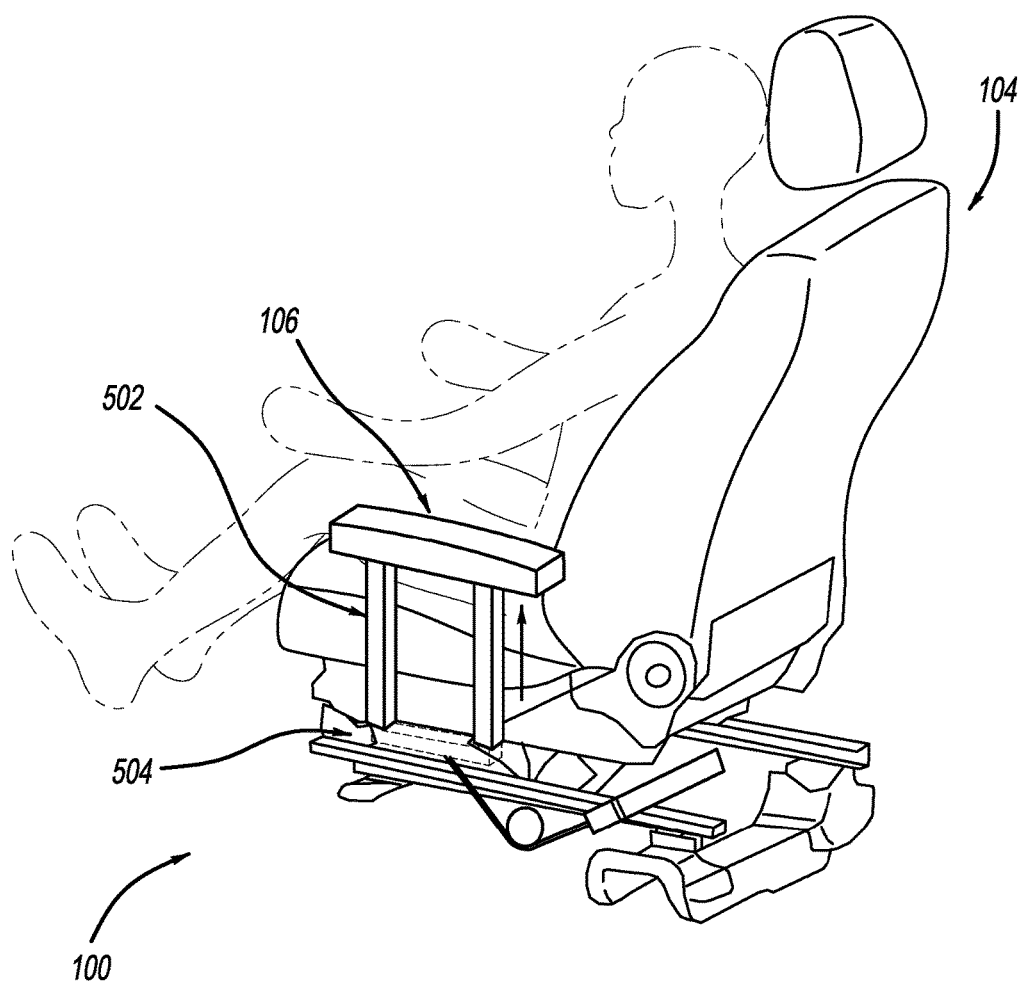

In yet another embodiment, and as illustratively depicted in FIG. 5A and FIG. 5B, the armrest 106 may be positioned alongside the seat base 102. In this configuration, the armrest 106 may be connected to the seat base 102 via a floor support 504 which in turn is connected to the seat base 102. The armrest 106 is presented with a pair of legs 502 that are in turn connected to the floor support 504. The armrest 106 extends away from the floor support 504 via the legs 502 in an open position as shown in FIG. 5B and retracts towards the floor support 504 via the legs 502 in a closed position as shown in FIG. 5A. Although two legs 502 are depicted in FIG. 5A, the number of legs 502 may vary which, in certain instances, may be one, two, three or more.

The manner of operation for the pretensioner may be similar to that referenced in FIG. 1A, FIG. 1B, FIG. 4A and FIG. 4B. However, some modifications may be incorporated to accommodate the various positions of the pretension unit relative to the vehicle interior.

For instance, and as illustratively depicted in FIG. 5A, the cable 128 of the pretension unit 108 may be connected to an adapter 508. The adapter 508 includes a bar 510 supporting two leg receivers 512 each of which to receive the legs 502. The adapter 508 may be made of metal and be rendered relatively rigid.

Referring back to FIG. 5A, the pretensioner 118 may be mounted substantially horizontally under a seat pan 514. The pulley 138 may be mounted under the seat pan 514 to guide the cable 128 as included in the pretension unit 108. The cable 128 may be provided with sufficient slack to deploy the armrest 106 without generating any unnecessary tension in the cable 128.

Referring back to FIG. 5B and further in view of FIG. 4C1 and FIG. 4C2, when the armrest is deployed, the slack in the cable 128 vanishes and the cable 128 hugs the pulley 138. This allows the armrest to reset to a stowed position in a split second when the pretensioner 118 is activated.

In one or more embodiments, the disclosed invention as set forth herein overcomes the challenges faced by known production and uses of vehicle armrests. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A seat assembly of a vehicle, comprising:
   a seat base;
   a seat back connected to the seat base;
   an armrest rotatably coupled with at least one of the seat back and the seat base; and
   a pretension unit including a cable and a pretensioner, the cable being connected to the armrest such that the armrest is retractable to be pulled to rotate forwardly and downwardly toward the seat base upon an activation of the pretensioner.

2. The seat assembly of claim 1, wherein the pretension unit further includes a pulley in communication with the cable, such that the cable is connected to an underside of the armrest via the pulley to effect a pulling of the armrest toward the seat base.

3. The seat assembly of claim 1, wherein the armrest includes a first part, a second part, and a lockable hinge connecting the first and second parts, the second part extends away from the seat back in an open position and retracts towards the seat base in a closed position, and wherein the cable is connected to an underside of the second part.

4. The seat assembly of 3, wherein the second part is received within a cavity positioned on and defined into the seat back when fully retracted.

5. The seat assembly of claim 3, wherein the pretension unit further includes a pulley in communication with the cable and positioned spaced apart from the lockable hinge.

6. The seat assembly of claim 3, further comprising a glider connected to the second part such that an end of the cable glides through the glider between the open position and the closed position.

7. A seat assembly of a vehicle, comprising:
   a seat base;
   a seat back connected to the seat base;
   an armrest connected to the seat back and including a first part, a second part, and a lockable hinge connecting the first and second parts;
   a glider positioned on an underside of the second part; and
   a pretension unit including a cable, a pulley and a pretensioner, the pulley being spaced apart from the lockable hinge, the cable contacting and being glidable through the glider via the pulley to effect a pulling of the second part toward the seat base upon an activation of the pretensioner in response to an adverse event, wherein the second part is received within a cavity of the seat back when fully retracted.

* * * * *